(12) United States Patent
Zitzmann et al.

(10) Patent No.: US 10,455,405 B2
(45) Date of Patent: Oct. 22, 2019

(54) TELEPHONE CALL PROCEDURES FOR POWER EFFICIENT MOBILE TERMINATING PACKET SWITCHED SERVICES

(71) Applicant: Intel IP Corporation, Santa Clara, CA (US)

(72) Inventors: Michael Zitzmann, Nuremberg (DE); Sudeep Manithara Vamanan, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 105 days.

(21) Appl. No.: 15/692,477

(22) Filed: Aug. 31, 2017

(65) Prior Publication Data

US 2019/0069161 A1 Feb. 28, 2019

(51) Int. Cl.
*H04W 8/08* (2009.01)
*H04L 29/08* (2006.01)
*H04L 29/12* (2006.01)
*H04W 68/00* (2009.01)

(52) U.S. Cl.
CPC .......... *H04W 8/087* (2013.01); *H04L 61/256* (2013.01); *H04L 67/145* (2013.01); *H04L 67/2861* (2013.01); *H04W 68/005* (2013.01); *H04L 61/2514* (2013.01); *H04L 67/125* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 8,417,791 B1 * | 4/2013 | Peretz | H04L 63/18 379/201.02 |
| 2010/0232593 A1 * | 9/2010 | Ku | H04L 29/1216 379/220.01 |
| 2011/0103371 A1 * | 5/2011 | Russell | H04L 41/147 370/352 |

* cited by examiner

*Primary Examiner* — Diane L Lo
(74) *Attorney, Agent, or Firm* — Schwegman Lundberg & Woessner, P.A.

(57) ABSTRACT

A server application executing on the public Internet may establish or re-establish a packet data network (PDN) connection with a client application executing on mobile device over a cellular network by initiating a telephone call to the mobile device via a cellular access network node according to a telephone number associated with the client application. The mobile device may receive a paging for the telephone call from the cellular access network node. In response to the paging, the mobile device may determine a PDN communication channel associated with the server application, the PDN including the cellular access network node, and send a set of data to the server application via the determined PDN communication channel. The server application may, in response to receiving the set of data, send a second data set of data to the client application over a PDN communication channel associated with the client application.

22 Claims, 11 Drawing Sheets

TELEPHONE CALL PROCEDURES FOR POWER EFFICIENT MOBILE TERMINATING PACKET SWITCHED SERVICES

BACKGROUND

Mobile devices, e.g., cellular telephones and other mobile devices that have wireless connectivity through cellular telephone networks, may access servers and applications that run on servers on the public Internet through a wireless data communications protocol, e.g., Long Term Evolution (LTE), Evolved High Speed Packet Access (HSPA+), Worldwide Interoperability for Microwave Access (WiMAX), Enhanced Data Rates for Global System for Mobile Communications (GSM) Evolution (EDGE), Evolution-Data Optimized (EVDO), etc. When the mobile device accesses an application on the Internet, network address translation (NAT) is performed within the cellular wireless network infrastructure to route data between the mobile device and the application by remapping an Internet Protocol (IP) address space within the wireless network into the IP address space of the public Internet. A NAT entry for routing the mobile device to the application on the public Internet may be removed after a period of time in which there is no communication between the application and the mobile device. This may be referred to as a NAT timeout. The mobile device may still reach the application on the public Internet by establishing a new connection with a new NAT entry; however, the application may be unable to reach the mobile device once the NAT entry expires, because mobile devices are typically not directly addressable for applications on the public Internet. Therefore, workarounds may be used to prevent the NAT entry from expiring. One typical workaround to facilitate an application on the public Internet being able to reach a given mobile device on demand by preventing the NAT entry from expiring is for the mobile device and the application to sporadically or periodically exchange dummy data to prevent a NAT timeout and maintain the connection originally established by the mobile device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
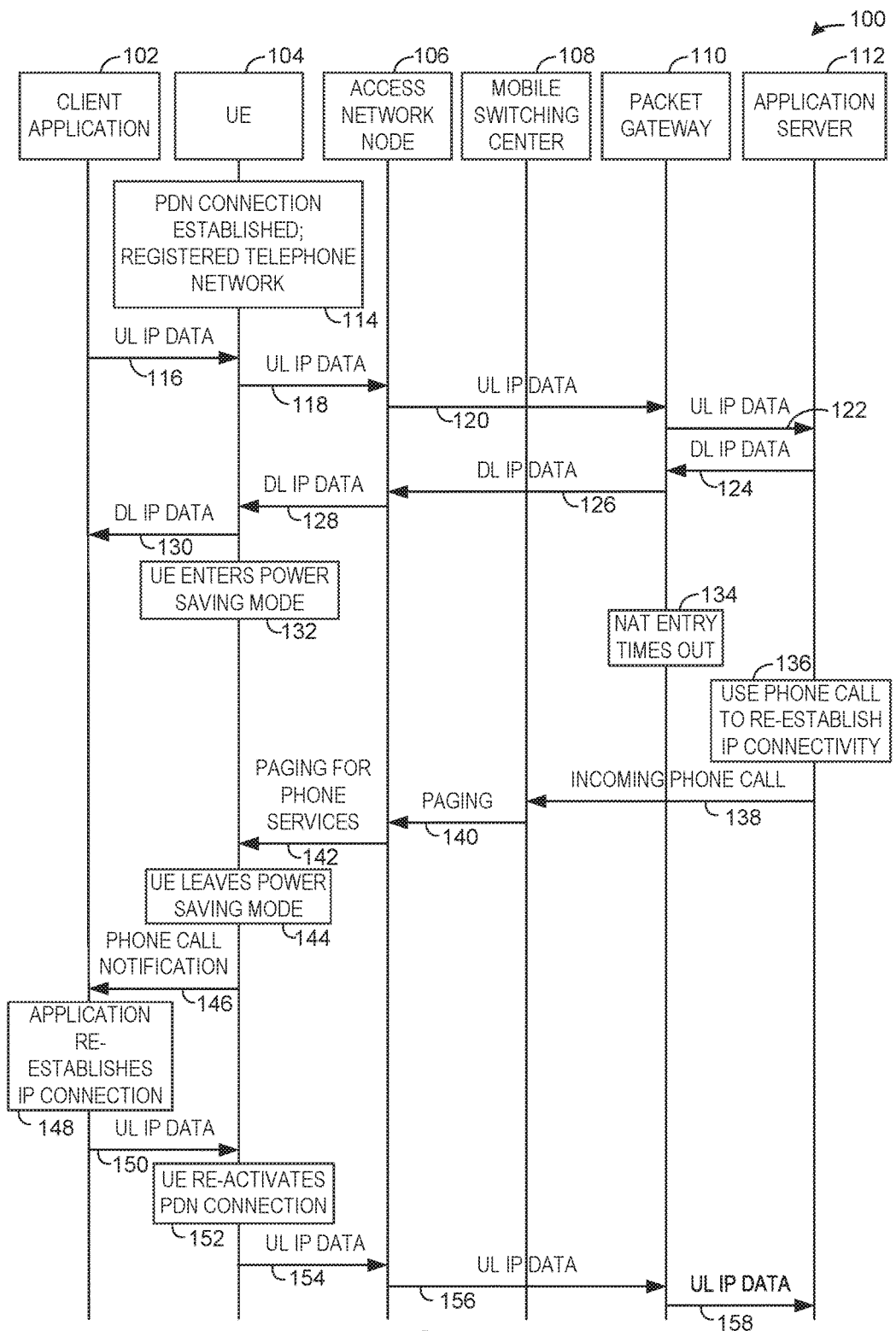
FIG. 1 is a message sequence chart illustrating a telephone call procedure for power efficient mobile terminating packet switched services, in accordance with some embodiments.

Maintaining a connection between a client application executing on a mobile device on a wireless network and a server application executing on an application server on the public Internet by sporadically or periodically exchanging dummy data may increase a load on the wireless network on which the mobile device operates as well as increase power consumption of the mobile device, thereby reducing its battery life. In addition, unpredictability of the timing of the NAT timeout on the wireless network may lead to more frequent exchanges of dummy data than may be required, further exacerbating the problems associated with the dummy data exchange. The power consumption problem may be particularly troublesome for power supply constrained mobile devices such as in-vehicle infotainment systems (IVI), where a vehicle may be parked for a longer duration, e.g., days or weeks, without any activity while the mobile device's dummy data exchange drains its battery. Embodiments discussed herein address these issues.

Data communications over a cellular wireless network typically operates via a packet data network (PDN) using a different protocol than telephone calls over the cellular network. Typically, telephone calls over the cellular network use circuit switching (CS) protocols, although this should not be construed as limiting, as voice over IP (VoIP) may also support telephone calls over a cellular network. One example of VoIP over a cellular network is voice over LTE (VoLTE), based on the IP multimedia subsystem (IMS) network. VoIP may also be utilized in conjunction with 5G New Radio (5G NR). For VoIP, various other protocols and networks may be involved, for example, a Session initiation Protocol (SIP) server and a Proxy Call Session Control Function (P-CSCF) protocol.

For telephone calls, a mobile device may have assigned a telephone number or a mobile station international subscriber directory number (MS-ISDN). A mobile device may be directly accessed by a telephone number associated with the mobile device over the cellular network by a device that communicates over the public switched telephone network (PSTN). Thus, even when a mobile device may not be accessible by an application using the public Internet, it may still be accessible by the application using the PSTN. To initiate a connection with the mobile device, an application on the public Internet that is also connected to the PSTN may place a telephone call to the mobile device via the PSTN, which may cause the cellular network infrastructure with which the mobile device is communicatively coupled to initiate a paging of the mobile device over the cellular network. The mobile device may be triggered by the paging to wake up, e.g., come out of a power saving mode, and/or establish a connection over the public Internet with the application that initiated the telephone call to the mobile device. The mobile device may not go through all the cellular network protocol steps to accept the telephone call associated with the paging, but may simply perform one or more functions in response to the paging. The mobile device may or may not support telephone calls in general. As long as the mobile device is registered with the cellular network with a telephone number to receive a paging when the telephone number associated with the mobile device is dialed on the PSTN, the mobile device may be reachable by the server application executing on an application server on the public Internet via the PSTN.

In various embodiments, data communications between a client application on the mobile device and a server application executing on a server on the public Internet may utilize IP, IP version 6 (IPv6), Transmission Control Protocol (TCP), and/or User Datagram Protocol (UDP). In various embodiments, the telephone call over the PSTN may utilize a Signaling System 7 (SS7) protocol to reach the mobile network. These standards may include, but are not limited to, the following:

TABLE 1

| SS7 Standards | | | |
|---|---|---|---|
| SS7 Level | ITU Standard | ANSI Standard | JTC (Japan) Standard |
| MTP Level 2 | ITU Q.701-Q.703, 1992 | ANSI T1.111.2-.3, 1992 | JT-Q.701-JT-Q.703, 1992 |
| MTP Level 3 | ITU Q.704-Q.707, 1992 | ANSI T1.111.4-.7, 1992 | JT-Q.704-JT-Q.707, 1992 |
| SCCP | ITU Q.711-Q.714, 1992 | ANSI T1.112, 1992 | JT-Q.711-JT-Q.714, 1992 |
| TUP | CCITT Q.721-Q.724, 1988 | N/A | N/A |
| ISUP | ITU Q.761-Q.764, 1992 | ANSI T1.113, 1992 | JT-Q.761-JT-Q.764, 1992 |
| TCAP | ITU Q.771-Q.775, 1992 | ANSI T1.114, 1992 | JT-Q.771-JT-Q.775, 1992 |

In various embodiments, the cellular wireless network may use a cellular data communication standard including one of a 3rd Generation Partnership Project (3GPP) family, a 3GPP2 family, or an IEEE family. These may include GSM, Universal Mobile Telecommunications System (UMTS), Wideband Code Division Multiple Access (W-CDMA), Time-Division Synchronous Code Division Multiple Access (TD-SCDMA), Time-Division Code Division Multiple Access (TD-CDMA), Evolution-Data Optimized (EVDO), High Speed. Packet Access (HSPA), Long Term Evolution (LTE), Worldwide Interoperability for Microwave Access (WiMAX), IEEE 802.16, High Capacity Spatial Division Multiple Access (HC-SDMA or iBurst), IEEE 802.20, LTE Advanced (LTE-A), LTE Advanced Pro (LTE-A Pro), 5G, and others.

Because embodiments of the client application executing on the mobile device may be reachable by the server application directly via the PSTN, the embodiments may not exchange dummy data with the server application sporadically or periodically, thereby reducing a load on the cellular network as well as reducing power consumption of the mobile device. In addition, no particular specifications regarding NAT timeout may be required in order for two-way connectivity between the embodiments of the client application executing on the mobile device and the server application to be maintained. Two-way connectivity between the embodiments of the client application and the server application may be maintained without any modification to the cellular network infrastructure or protocols, as the mobile device and application server may be configured to perform the methods described herein to maintain on-demand two-way connectivity over standard cellular network and public Internet infrastructures using standard communications protocols.

FIG. 1 is a message sequence chart illustrating a telephone call procedure 100 for power efficient mobile terminating packet switched services, in accordance with some embodiments. A client application 102 may be executed on user equipment (UE) 104 over a cellular network. The UE 104 may include a mobile device, cellular telephone, a tablet computer, a personal digital assistant (PDA), an IVI, or other portable device with wireless connectivity over the cellular network using a cellular network communications protocol. The client application 102 may include firmware or software executed by a processor of the UE 104. The cellular network may include an access network node 106 and a mobile switching center (MSC) 108. The MSC 108 may route mobile telephone calls between the UE 104 and the PSTN. The access network node 106 may wirelessly connect the UE 104 with the MSC 108, for example, via a non-access stratum (NAS) signaling protocol for registering the UE for mobile telephone calls and to handle paging requests from the MSC 108 to the access network node 106. An example of the NAS protocol includes: 3GPP TS 24.008 Mobile radio interface Layer 3 specification; Core network protocols; Stage (see https://portal.3gpp.org/desktopmodules/Specifications/SpecificationDetails.aspx?specificationId=1015).

The UE 104 and the access network node 106 may also communicate via a lower protocol layer, e.g., a radio resource control (RRC) standard. Examples of the RRC standard include the following:

GSM: 3GPP TS 44.018 Mobile radio interface layer 3 specification; GSM/EDGE Radio Resource Control (RRC) protocol (see https://portal.3gpp.org/desktop-modules/Specifications/SpecificationDetails.aspx-?specificationId=2686)

UMTS: 3GPP TS 25.331 Radio Resource Control (RRC); Protocol specification (see https://portal.3gpp.org/desktopmodules/Specifications/SpecificationDetails.aspx?specificationId=1180)

A packet gateway 110 may support data communications connectivity between the data network operating over the cellular network and the public Internet. The packet gateway 110 may control network address translation (NAT) between the UE 104 and applications on the public Internet. An application on the public Internet may execute on an application server 112. The application server 112 may be communicatively coupled with the cellular network in a packet switched (PS) mode via the packet gateway 110 over a PDN. The application server 112 may also be communicatively coupled with the cellular network in a circuit switched (CS) mode via the MSC 108 over the PSTN.

At an initial stage 114, the UE 104 has established a PDN connection with the cellular network and has registered itself for circuit switched (or VoLTE) service with the cellular network. Therefore, the UE 104 may communicate with the application server 112 via the public Internet, and the application server 112 may reach the UE 104 via the PSTN. The client application 102 executing on the UE 104 may send an uplink (UL) IP data element to an application executing on the application server 112 via the cellular network and public Internet, and may receive a downlink (DL) IP data element from the application in response.

At a stage 116, the client application 102 executing on the UE 104 may send the UL IP data element to the UE 104 for transmission over the cellular network. At a stage 118, the UE 104 may transmit the UP IP data element to the access network node 106. At a stage 120, the access network node 106 may send the UL IP data element to the packet gateway 110. At a stage 122, the packet gateway 110 may send the UL IP data element to the application server 112. In response to the UI. IP data element received by the application server 112, at a stage 124, the application server 112 may send a DL IP data element to the packet gateway 110. At a stage 126, the packet gateway 110 may send the DL IP data element to the access network node 106. At a stage 128, the access network node 106 may send the DL IP data element to the UE 104. At a stage 130, the UE 104 may route the DL IP data element to the client application 102. After the data exchange between the client application 102 and the server application executing on the application server 112, the UE 104 may enter a power saving mode at a stage 132. The power saving mode may be entered, for example, by an IVI device after an automobile in which the IVI device is installed is parked for a period of time. The automobile may be parked for hours, days, or weeks with the IVI in a power saving mode.

After a timeout period on the cellular network, the NAT entry may timeout at the packet gateway 110 at a stage 134. The timeout period for a NAT timeout may differ from one cellular network to another, and in some embodiments, may not be predefined. In various embodiments, the NAT timeout may occur after approximately 15 minutes without data exchange, or 30 minutes, or another period of time as determined by the cellular network operator and/or current network congestion or other conditions of the cellular network. When a data element is exchanged via the packet gateway 110, a time for NAT timeout associated with the NAT entry used for the data element exchange may be reset, thereby facilitating exchanges of dummy data packets to prevent NAT timeout for the NAT entry associated with the data exchange. If the application server 112 attempts to send a DL IP data element to the client application 102 after the NAT timeout stage 134, the application server 112 may not receive an UL data element in response. When the packet gateway 110 receives a DL IP data element from the application server 112 after the NAT timeout, the packet gateway 110 may simply drop the DL IP data element rather than forward it or do anything in response to it.

In some embodiments, the server application running on the application server 112 may determine after a period of time without having received an UL data element in response to attempt to re-establish a data connection with the client application 102 via the PSTN. In some embodiments, the server application running on the application server 112 may determine that after a set period of time since the last successful communication exchange with the client application has elapsed, the server application running on the application server 112 should attempt to re-establish a data connection with the client application 102 via the PSTN. In some embodiments, each time the application running on the application server 112 intends to communicate with the client application 102, the application running on the application server 112 may attempt to establish a data connection with the client application 102 via the PSTN. These latter embodiments may be embodiments in which the application running on the application server 112 communicates infrequently with the client application 102, or generally initiates communications with the client application 102 rather than the client application 102 initiating the connections.

At a stage 136, the application server 112 may use a telephone call over the PSTN to establish or re-establish IP connectivity (e.g., an IP communication channel) with the client application 102. The application server 112 may initiate a mobile terminated call to the UE 104 via the MSC 108 at a stage 138. Upon receiving the incoming telephone call, the MSC 108 may initiate paging of the UE 104 via the access network node 106 at a stage 140. In response to receiving a paging from the MSC 108, the access network node 106 may initiate paging for telephone services to the UE 104 at a stage 142. Upon receiving the paging from the access network node 106, at a stage 144, the UE 104 may leave power saving mode. At a stage 146, the UE 104 may notify the client application 102 executing on the UE 104 that a notification of an incoming telephone call has been received by the UE 104. The client application 102 may have previously registered with the UE 104 to be notified upon receipt of an incoming telephone call.

The notification of the incoming telephone call by the UE 104 may also include information pertaining to a caller identification (ID) associated with the incoming telephone call. In some embodiments, the UE 104 may not respond to the received paging, but just treat the paging as a notification that an incoming telephone call has been received without caring about the originating source of the incoming telephone call. In some embodiments, the UE may continue with the telephone services protocol that initiated the paging, e.g., a NAS Call Control protocol, at least to a point of receiving the caller ID information pertaining to the incoming telephone call. The caller ID information may be derived during a Call Control protocol exchange following processing of the paging. The caller ID information may be used by the client application 102 to determine which of a plurality of applications and/or application servers 112 initiated the incoming telephone call in order to determine which of the plurality of applications and/or application servers 112 is attempting to establish or re-establish an IP connection with the client application 102. In some embodiments, the UE 104 may ignore or reject the incoming telephone call once all the information needed by the client application 102 to establish or re-establish an IP connection is received. In some embodiments, the TIE 104 may treat the incoming telephone call as a normal incoming voice telephone call is treated in the cellular network in parallel with performing the operations discussed herein pertaining to facilitating establishment of an IP connection between the client application 102 and the application executing on the application server 112.

At a stage 148, in response to the notification of the incoming telephone call by the UE 104, the client application 102 may attempt to establish or re-establish an IP connection with the application executing on the application server 112 that initiated the incoming telephone call. In some embodiments, the client application 102 may have stored in a memory the IP address of the application server 112 so that whenever it is notified of an incoming telephone call by the UE 104, the client application 102 attempts to establish or re-establish an IP connection with the application executing on the application server 112. In other embodiments, the client application 102 may have stored in a memory a table of incoming telephone calls caller ID information associated with IP addresses of one or more application servers 112 and/or IP connection data to establish IP connections with one or more applications executing on one or more application servers 112. When caller ID information regarding the incoming telephone call is provided to the client application 102 by the UE 104, the client application 102 may use the table to look up the IP connection data in order to establish or re-establish an IP connection with the application executing on the application server 112 associated with the caller ID information of the incoming telephone call.

At a stage 150, the client application 102 executing on the UE 104 may send a UL IP data element to the UE 104 for transmission over the cellular network. At a stage 152, the UE 104 may re-activate the PDN connection previously activated at the stage 114. At a stage 154, the UE 104 may transmit the UL IP data element to the access network node 106. At a stage 156, the access network node 106 may send the UL IP data element to the packet gateway 110. At a stage 158, the packet gateway 110 may send the UL IP data element to the application server 112 to complete re-establishment of the IP connection between the client application 102 and the application executing on the application server 112. Upon receipt of the UL IP data element, the application server 112 may consider the IP connection with the client application 102 to be re-established and discontinue the telephone call placed to the telephone number associated with the client application 102. Upon completion of re-establishment of the IP connection, the application executing on the application server 112 may proceed to send DL data elements to the client application 102 as discussed above prior to NAT timeout.

Figure 2:
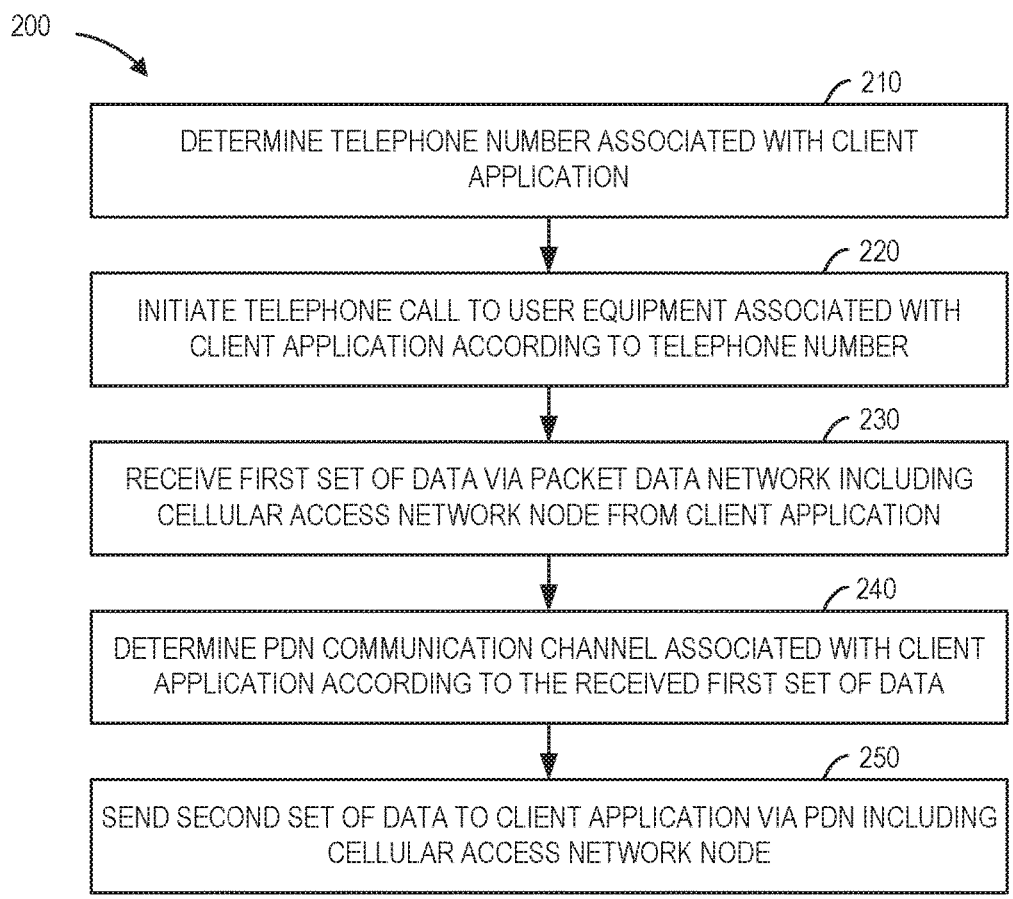
FIG. 2 is a flow chart illustrating a method of communications by an application server, in accordance with some embodiments.

FIG. 2 is a flow chart illustrating a method 200 of communications by an application server 112, in accordance with some embodiments. Operations of the method 200 may correspond to the sequence of stages illustrated in FIG. 1. The operations of the method 200 may be performed by a server application executing on the application server 112 to establish or re-establish IP connectivity with a client application 102 executing on a UE 104 as described with reference to FIG. 1. The application server 112 may include memory and processing circuitry coupled to the memory. The server application may configure the processing circuitry of the application server 112 to perform the operations of the method 200. The application server 112 may include transceiver circuitry coupled to the processing circuitry. The application server 112 may also include one or more antennas coupled to the transceiver circuitry.

In an operation 210, the server application may determine a telephone number associated with the client application and/or the UE 104 on which the client application executes. The telephone number may be an MS-ISDN via which the UE 104 may be directly accessed over the cellular network by the application server 112 placing a telephone call over the PSTN. The server application may store the telephone number in the memory of the application server 112.

In an operation 220, the server application may initiate a telephone call to the client application. In some embodiments, the server application may control the application server 112 to initiate a telephone call to the UE 104 associated with the client application. The telephone call may be placed on the PSTN, reach the cellular network via the MSC 108, and reach the UE 104 via the access network node 106 of the cellular network according to the telephone number. In some embodiments, the telephone call may be initiated in response to a period of time after the server application sends a prior set of data to the client application 102 without receiving another set of data from the client application 102 in response to the prior set of data exceeding a timeout threshold.

In an operation 230, the server application may receive a first set of data via a PDN including the cellular access network node 106 from the client application 102. The first set of data may include a data packet. The first set of data may be received after other sets of data, null data packets, data packets, or other packets are received by the server application from the client application 102, as the designation "first" may be used herein merely to differentiate the first set of data from another set of data given another designation herein. The first set of data may be received by the server application in response to the telephone call initiated by the server application in the operation 220. Once the first set of data is received, the application server may disconnect or discontinue the telephone call initiated by the server application to the client application 102 in the operation 220.

In an operation 240, the server application may determine a PDN or IP communication channel associated with the client application 102 according to the received first set of data. The first set of data may include an IP address by which the server application may communicate with the client application 102 via the packet gateway 110. The server application may store information identifying the PDN communication channel associated with the client application 102 in the memory of the application server 112.

In an operation 250, the server application executing on the application server 112 may send a second set of data to the client application 102 via the PDN including the cellular access network node 106 according to the PDN or IP communication channel associated with the client application 102. The second set of data may include a response to the first set of data or other data that may be sent from the client application 102 to the server application. The second set of data may include a data packet. In some aspects, the second set of data may include a series of data communications previously initiated that includes a prior set of data sent by the server application via the PDN including the cellular access network node 106 to the client application 102 before a NAT timeout of the packet gateway 100 prevented data to be continued to be sent from the server application to the client application 102.

Figure 3:
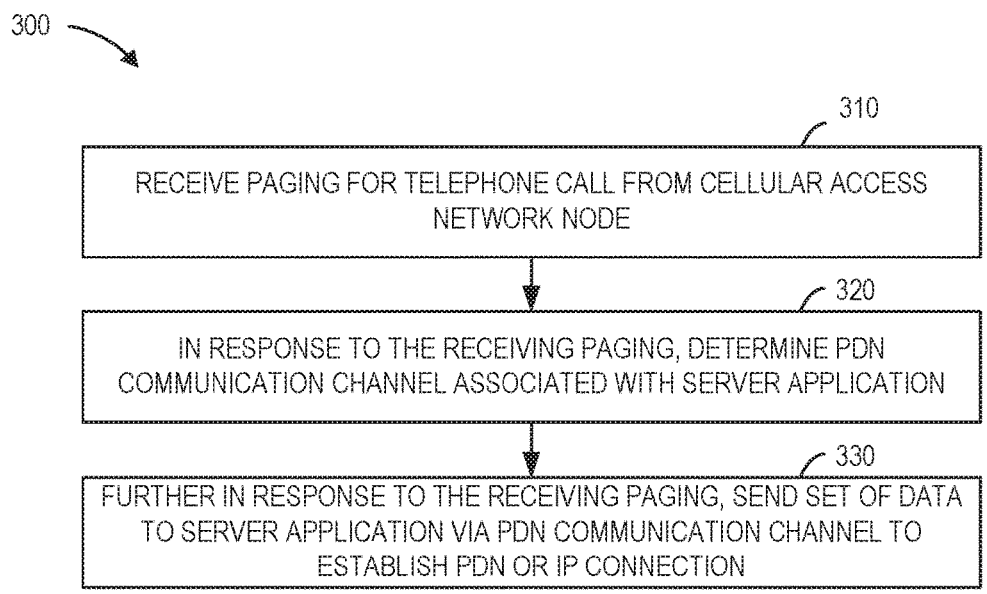
FIG. 3 is a flow chart illustrating a method of communications by a user equipment (UE), in accordance with some embodiments.

FIG. 3 is a flow chart illustrating a method 300 of communications by a UE 104, in accordance with some embodiments. Operations of the method 300 may correspond to the sequence of stages illustrated in FIG. 1, The operations of the method 300 may be performed by a client application 102 executing on the UE 104 to establish or re-establish IP connectivity with a server application executing on an application server 112 as described with reference to FIG. 1. The UE 104 may include memory and processing circuitry coupled to the memory. The client application 102 may configure the processing circuitry of the UE 104 to perform the operations of the method 300. The UE 104 may include transceiver circuitry coupled to the processing circuitry. The UE 104 may also include one or more antennas coupled to the transceiver circuitry.

In an operation 310, the UE 104 may receive a paging for a telephone call from a cellular access network node 106. The UE 104 may notify a client application 102 executing on the UE 104 of the received paging, so that the client application 102 receives notification of the paging for a telephone call received from the cellular access network node 106. The UE 104 may also receive caller ID data associating with the paging in some embodiments. The UE 104 may ignore any further telephone protocol communications from the cellular network after receiving the paging in some embodiments and therefore not receive the caller ID data. In some embodiments, the UE 104 may reject, ignore, and/or not accept an incoming telephone call associated with the paging after receiving the caller ID data.

In an operation 320, in response to the received paging for a telephone call of operation 310, the client application 102 may determine a PDN or IP communication channel associated with a server application and/or an application server 112 on which the server application executes. The PDN may include the cellular access network node 106. Data pertaining to the PDN or IP communication channel may include an IP address by which the server application may communicate with the client application 102 via the packet gateway 110. The client application 102 may store the data pertaining to the PDN or IP communication channel in the memory of the UE 104. The PDN or IP communication channel associated with the server application and/or the application server 112 may be determined at least in part according to the caller ID data associating with the paging in some embodiments. In some embodiments, the data pertaining to the PDN or IP communication channel may be predetermined and stored in a memory of the UE 104.

In an operation 330, further in response to the received paging for a telephone call of operation 310, the client application 102 may send a set of data to the server application executing on the application server 112 via the PDN or IP communication channel determined in the operation 320. The set of data sent may include the data pertaining to the PDN or IP communication channel discussed with respect to the operation 320. The set of data may be sent to the server application in order to establish or re-establish the PDN or IP communication channel between the client application 102 and the server application executing on the application server 112.

Figure 4:
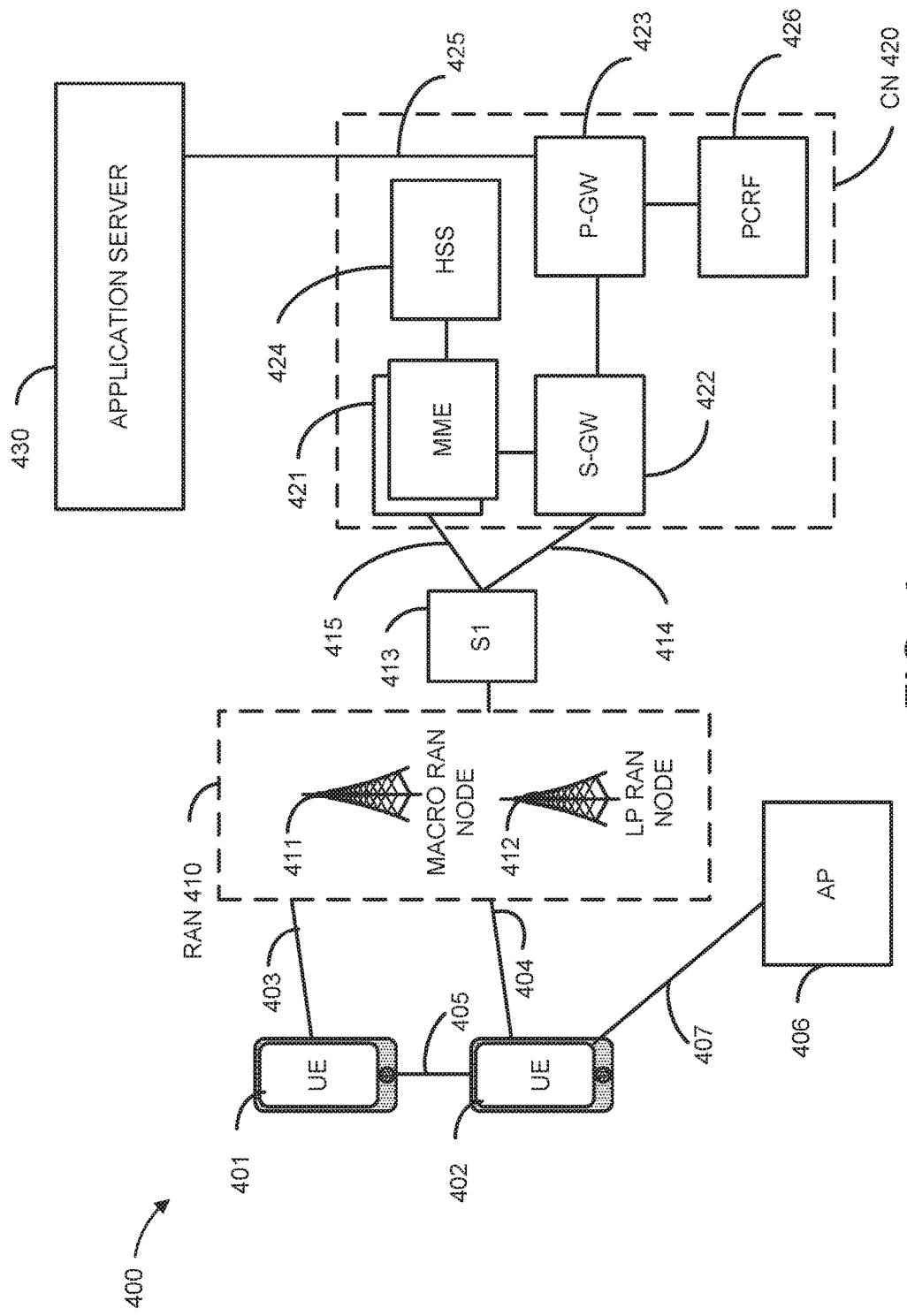
FIG. 4 illustrates an architecture of a system of a network, in accordance with some embodiments.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, IVI, laptop computers, desktop computers, wireless handsets, or any computing device including a wireless communications interface. In some aspects, the architecture 400 can be configured to perform include one or more additional functionalities, e.g., as disclosed in reference to FIG. 1 (e.g., functionalities performed by the access network node 106 and the mobile switching center 108).

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UNITS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSCCH), a Physical Sidelink Discovery Channel (PSDCH), and a Physical Sidelink Broadcast Channel (PSCCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network 423 and external networks such as a network including the application server 430 (alternatively referred to as application function (AF)) via an IP interface 425. Generally, the application server 430 may be an element offering applications that use IP bearer resources with the core network (e.g., UNITS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., VoIP sessions, PTT sessions, group communication sessions, social networking services, etc.) for the UEs 401 and 402 via the CN 420.

The P-GW 423 may further be a node for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's IP Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
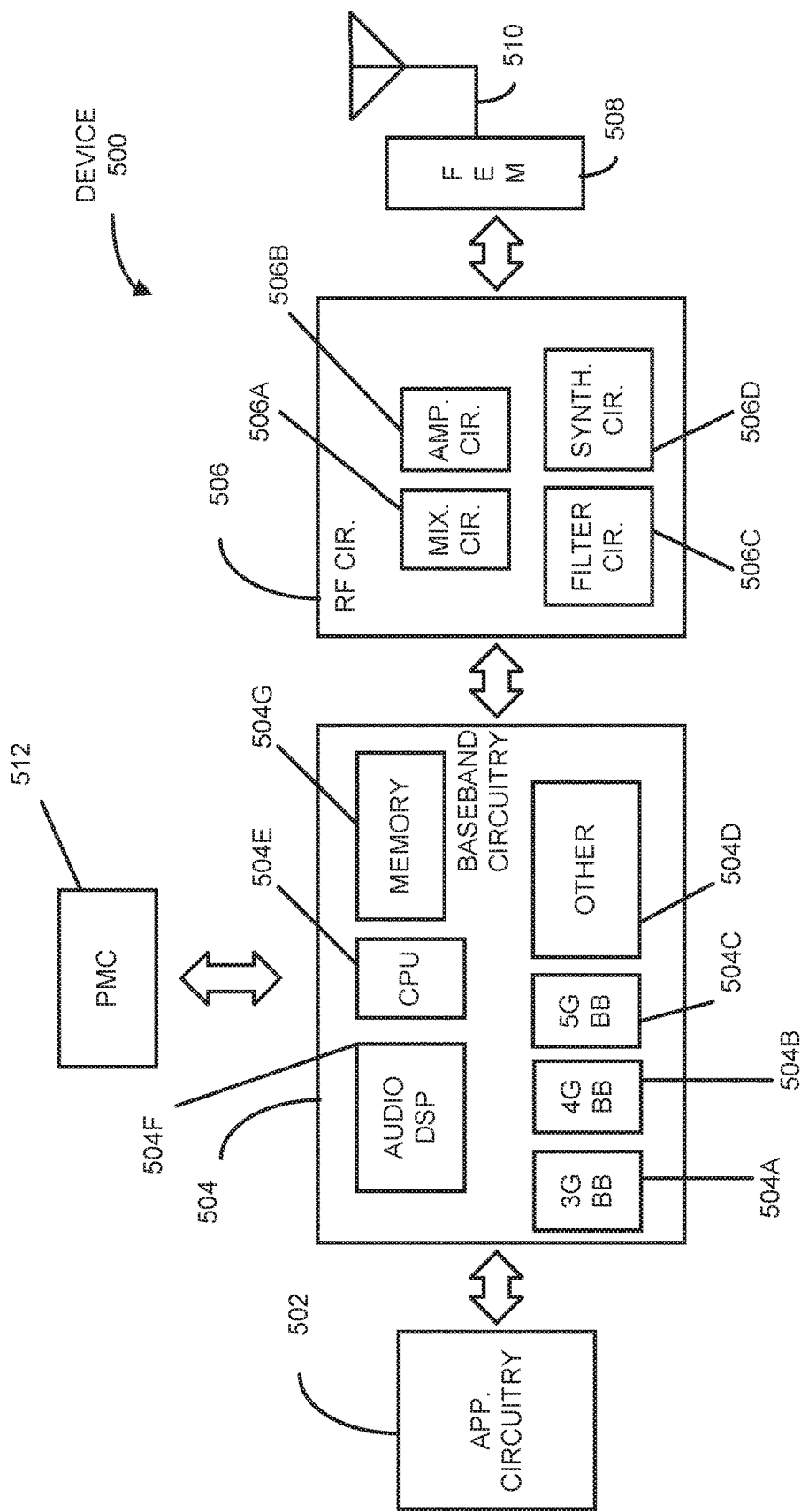
FIG. 5 illustrates example components of a device, in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RP circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, polar, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506A, amplifier circuitry 506B and filter circuitry 506C. In some embodiments, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506A of the receive signal path may comprise passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 504 and may be filtered by filter circuitry 506C.

In some embodiments, the mixer circuitry 506A of the receive signal path and the mixer circuitry 506A of the transmit signal path may include two or more mixers and may be arranged for quadrature downconversion and upconversion, respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer comprising a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL, may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 512 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
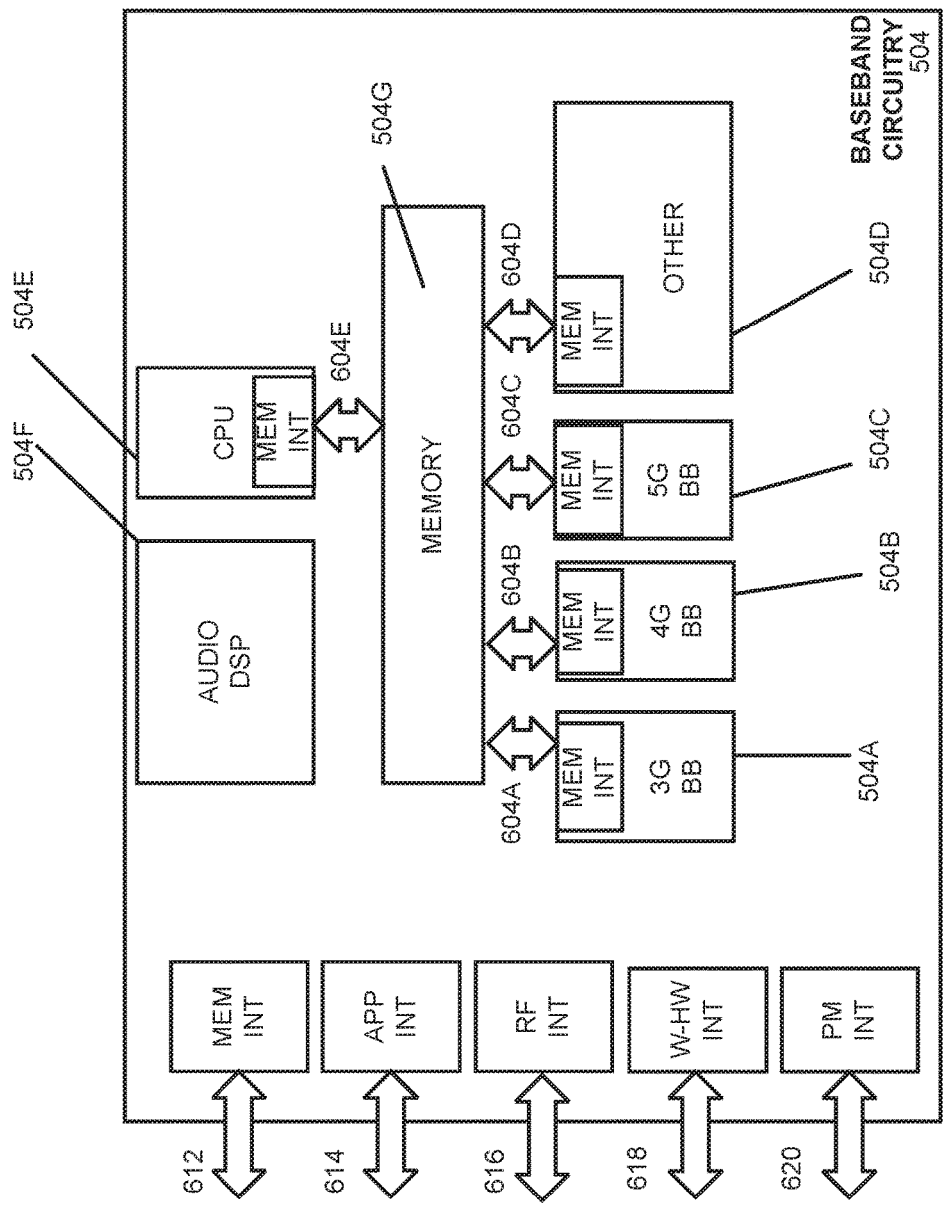
FIG. 6 illustrates example interfaces of baseband circuitry, in accordance with some embodiments.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512).

Figure 7:
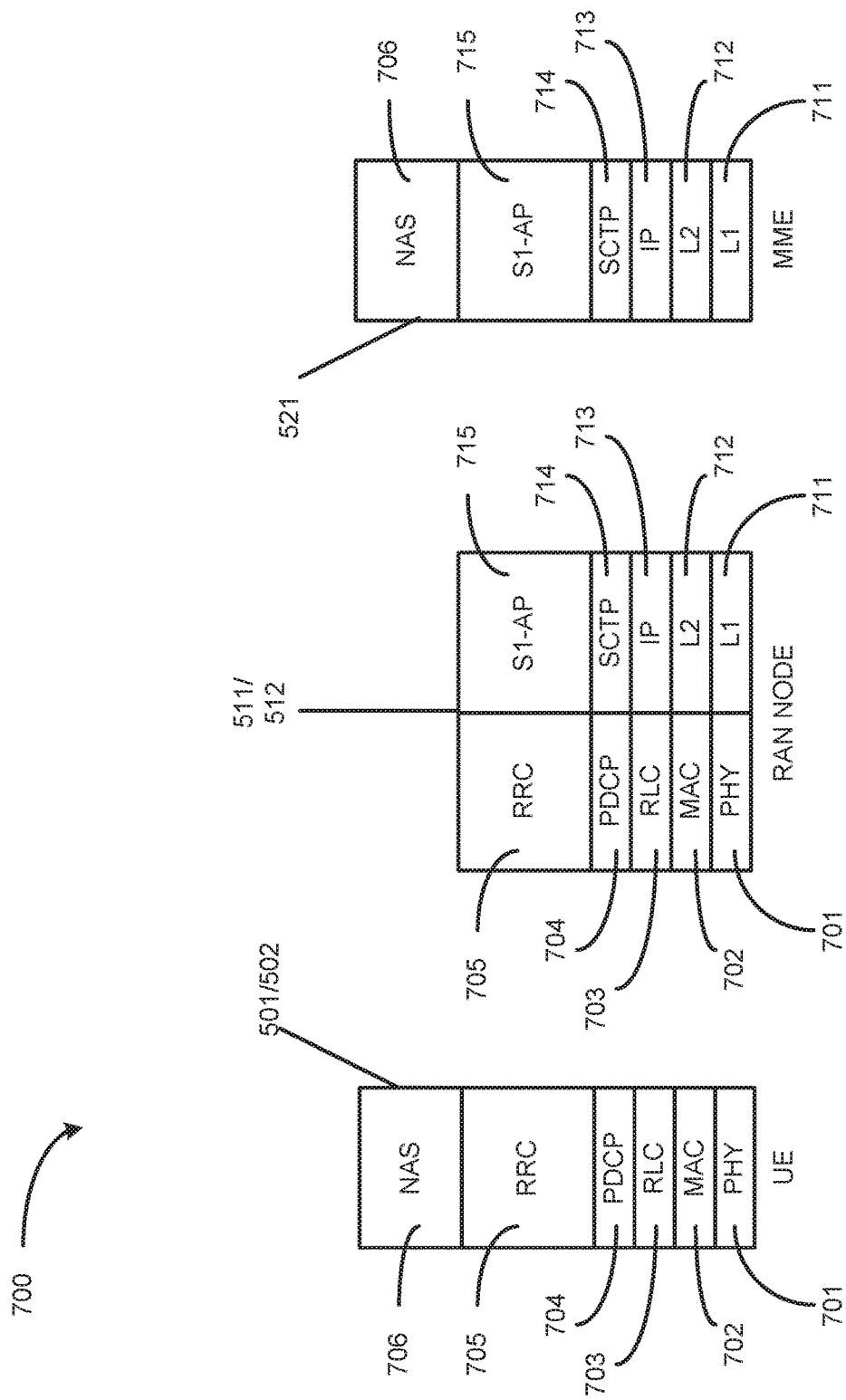
FIG. 7 is an illustration of a control plane protocol stack, in accordance with some embodiments.

FIG. 7 is an illustration of a control plane protocol stack in accordance with some embodiments. In this embodiment, a control plane 700 is shown as a communications protocol stack between the UE 401 (or alternatively, the UE 402), the RAN node 411 (or alternatively, the RAN node 412), and the MME 421.

The PHY layer 701 may transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as the RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 401 and the RAN node 411 may utilize a Uu interface (e.g., an LTE-Uu interface) to exchange control plane data via a protocol stack comprising the PHY layer 701, the MAC layer 702, the RLC layer 703, the PDCP layer 704, and the RRC layer 705.

The non-access stratum (NAS) protocols 706 form the highest stratum of the control plane between the UE 401 and the MME 421. The NAS protocols 706 support the mobility of the UE 401 and the session management procedures to establish and maintain IP connectivity between the UE 401 and the P-GW 423.

The S1 Application Protocol (S1-AP) layer 715 may support the functions of the S1 interface and comprise Elementary Procedures (EPs). An EP is a unit of interaction between the RAN node 411 and the CN 420. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 714 may ensure reliable delivery of signaling messages between the RAN node 411 and the MME 421 based, in part, on the IP protocol, supported by the IP layer 713. The L2 layer 712 and the L1 layer 711 may refer to communication links (e.g., wired or wireless) used by the RAN node and the MME to exchange information.

The RAN node 411 and the MME 421 may utilize an S1-MME interface to exchange control plane data via a protocol stack comprising the L1 layer 711, the L2 layer 712, the IP layer 713, the SCTP layer 714, and the S1-AP layer 715.

Figure 8:
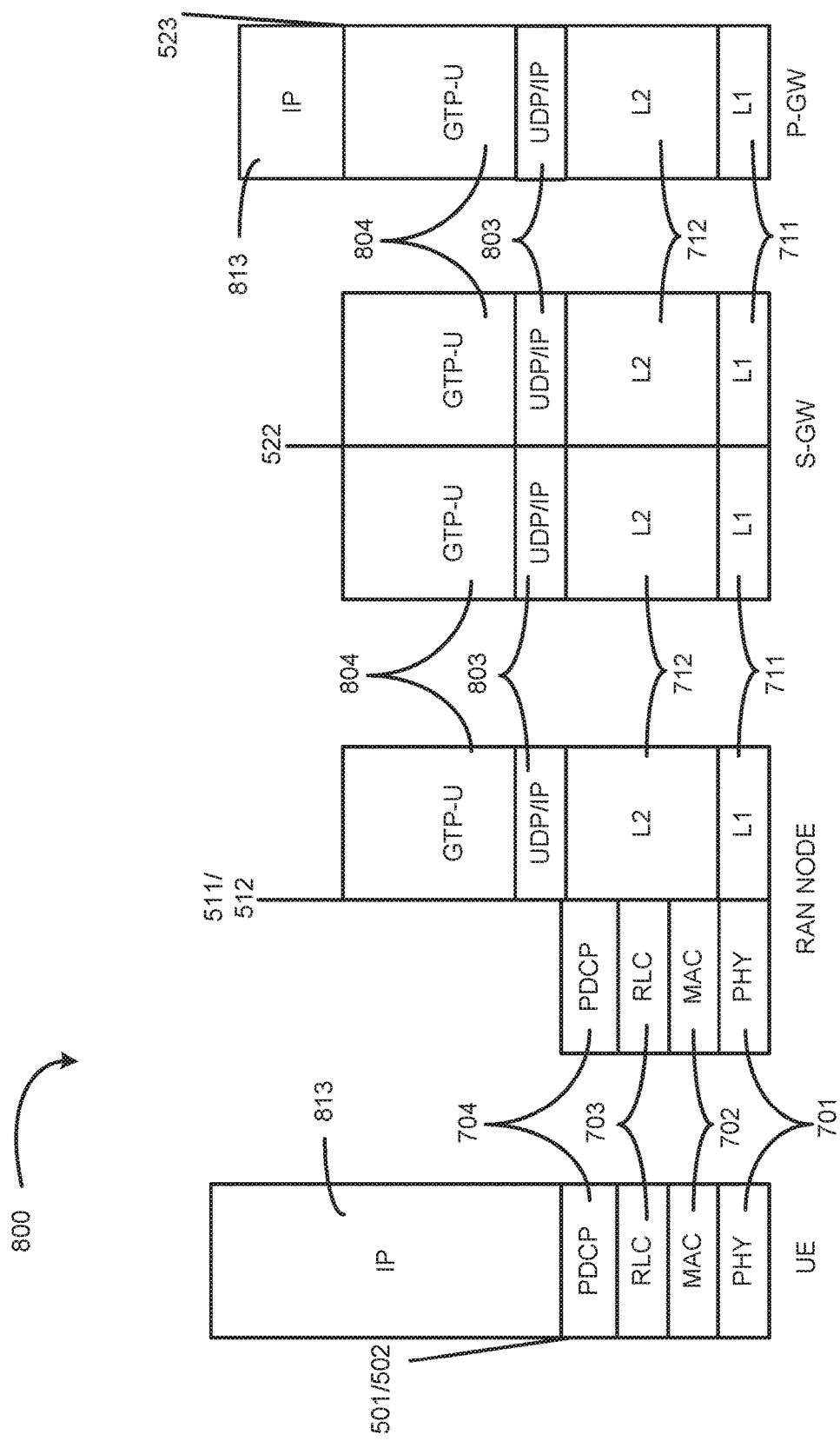
FIG. 8 is an illustration of a user plane protocol stack, in accordance with some embodiments.

FIG. 8 is an illustration of a user plane protocol stack in accordance with some embodiments. In this embodiment, a user plane 800 is shown as a communications protocol stack between the UE 401 (or alternatively, the HE 402), the RAN node 411 (or alternatively, the RAN node 412), the S-GW 422, and the P-GW 423. The user plane 800 may utilize at least some of the same protocol layers as the control plane 700. For example, the UE 401 and the RAN node 411 may utilize a Uu interface (e.g., an LTE-Uu interface) to exchange user plane data via a protocol stack comprising the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 411 and the S-GW 422 may utilize an S1-U interface to exchange user plane data via a protocol stack comprising the L1 layer 711, the L2 layer 712, the UDP/IP layer 803, and the GTP-U layer 804. The S-GW 422 and the P-GW 423 may utilize an S5/S8a interface to exchange user plane data via a protocol stack comprising the L1 layer 711, the L2 layer 712, the UDP/IP layer 803, and the GTP-U layer 804. As discussed above with respect to FIG. 7, NAS protocols support the mobility of the UE 401 and the session management procedures to establish and maintain IP connectivity between the UE 401 and the P-GW 423.

Figure 9:
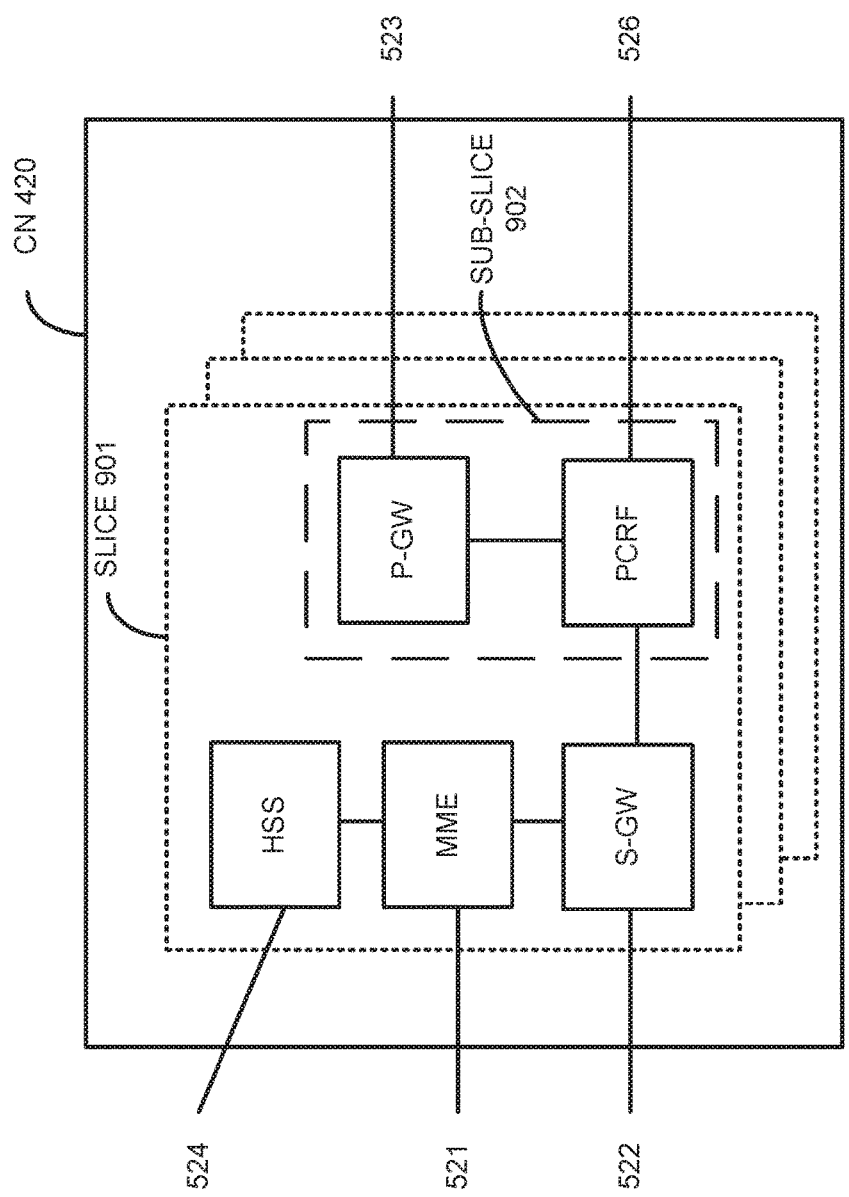
FIG. 9 illustrates components of a core network, in accordance with some embodiments.

FIG. 9 illustrates components of a core network in accordance with some embodiments. The components of the CN 420 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 420 may be referred to as a network slice 901. A logical instantiation of a portion of the CN 420 may be referred to as a network sub-slice 902 (e.g., the network sub-slice 902 is shown to include the PGW 423 and the PCRF 426).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
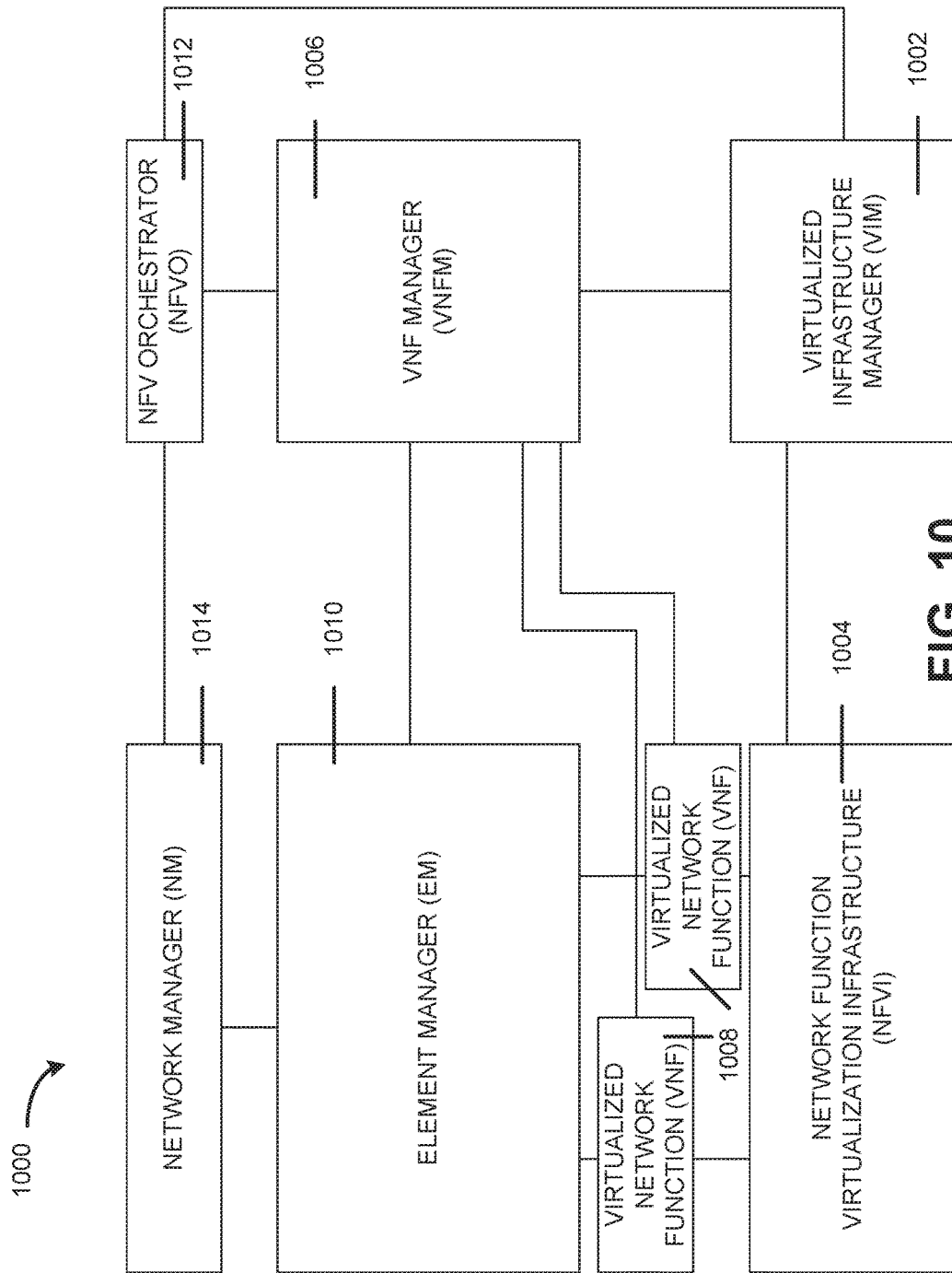
FIG. 10 is a block diagram illustrating components, according to some example embodiments, of a system 1000 to support NFV.

FIG. 10 is a block diagram illustrating components, according to some example embodiments, of a system 1000 to support NFV. The system 1000 is illustrated as including a virtualized infrastructure manager (VIM) 1002, a network function virtualization infrastructure (NFVI) 1004, a VNF manager (VNFM) 1006, virtualized network functions (VNFs) 1008, an element manager (EM) 1010, an NFV Orchestrator (NFVO) 1012, and a network manager (NM) 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NEVI 1004 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1006 may manage the VNFs 1008. The VNFs 1008 may be used to execute EPC components/functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, performance measurement (PM) data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NEVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Figure 11:
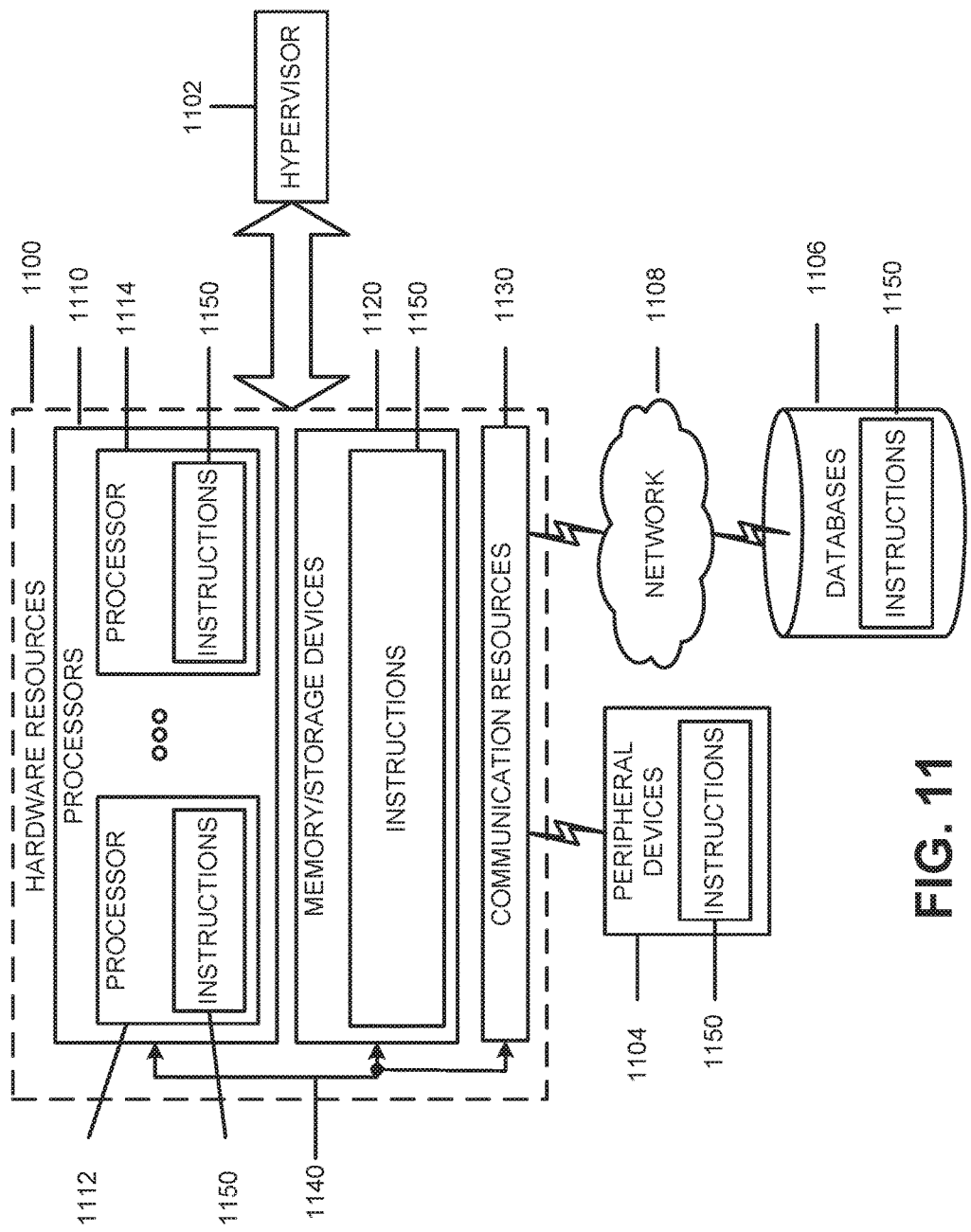
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

It should be noted that embodiments are not limited to the operations, phases, frames, signals and/or other elements shown in the FIGS. 1-11. Some embodiments may not necessarily include all operations, phases, frames, signals and/or other elements shown. Some embodiments may include one or more additional operations, phases, frames, signals and/or other elements. One or more operations may be optional, in some embodiments.

Example 1 is an apparatus of an application server, the apparatus comprising memory; and processing circuitry coupled to the memory, the processing circuitry configured to: determine a telephone number associated with a client application and store the telephone number in the memory; initiate a telephone call to a user equipment (UE) associated with the client application via a cellular access network node according to the telephone number; receive a first set of data via a packet data network (PDN) including the cellular access network node from the client application; determine a PDN communication channel associated with the client application according to the received first set of data; and send a second set of data to the client application via the PDN including the cellular access network node according to the PDN communication channel associated with the client application.

In Example 2, the subject matter of Example 1 optionally includes wherein the first set of data is received in response to the initiated telephone call.

In Example 3, the subject matter of any one or more of Examples 1-2 optionally include wherein the processing circuitry is further configured to send a prior set of data to the client application via the PDN including the cellular access network node, wherein the telephone call is initiated in response to a period of time after sending the prior set of data to the client application without receiving another set of data from the client application in response to the prior set of data exceeding a timeout threshold.

In Example 4, the subject matter of any one or more of Examples 1-3 optionally include wherein the processing circuitry is further configured to disconnect the telephone call to the UE associated with the client application in response to receiving the first set of data.

In Example 5, the subject matter of any one or more of Examples 1-4 optionally include transceiver circuitry coupled to the processing circuitry.

In Example 6, the subject matter of Example 5 optionally includes one or more antennas coupled to the transceiver circuitry.

Example 7 is a non-transitory computer-readable storage medium that stores instructions for execution by one or more processors to perform operations for communication by an application server comprising memory and processing circuitry coupled to the memory, the operations to configure the one or more processors to perform the following operations: determine a telephone number associated with a client application and store the telephone number in the memory; initiate a telephone call to a user equipment (UE) associated with the client application via a cellular access network node according to the telephone number; receive a first set of data via a packet data network (PDN) including the cellular access network node from the client application; determine a PDN communication channel associated with the client application according to the received first set of data; and send a second set of data to the client application via the PDN including the cellular access network node according to the PDN communication channel associated with the client application.

In Example 8, the subject matter of Example 7 optionally includes wherein the first set of data is received in response to the initiated telephone call.

In Example 9, the subject matter of Example 8 optionally includes instructions to perform operations to configure the one or more processors to send a prior set of data to the client application via the PDN including the cellular access network node, wherein the telephone call is initiated in response to a period of time after sending the prior set of data to the client application without receiving another set of data from the client application in response to the prior set of data exceeding a timeout threshold.

In Example 10, the subject matter of any one or more of Examples 8-9 optionally, include instructions to perform operations to configure the one or more processors to disconnect the telephone call to the UE associated with the client application in response to receiving the first set of data.

Example 11 is an apparatus of a user equipment (UE), the apparatus comprising memory; and processing circuitry coupled to the memory, the processing circuitry configured to: receive a paging for a telephone call from a cellular access network node; and in response to the received paging: determine a packet data network (PDN) communication channel associated with a server application, the PDN including the cellular access network node; and send a set of data to the server application via the determined PDN communication channel.

In Example 12, the subject matter of Example 11 optionally includes wherein the PDN communication channel associated with the server application is determined according to a caller identification data associated with the paging.

In Example 13, the subject matter of Example 12 optionally includes wherein the processing circuitry is further configured to reject a telephone call associated with the paging after receiving the caller identification data.

In Example 14, the subject matter of any one or more of Examples 11-13 optionally, include wherein PDN data to establish the PDN communication channel associated with the server application is predetermined and stored in the memory of the UE.

In Example 15, the subject matter of any one or more of Examples 11-14 optionally include wherein a telephone call associated with the paging is not accepted.

In Example 16, the subject matter of any one or more of Examples 11-15 optionally, include transceiver circuitry coupled to the processing circuitry.

In Example 17, the subject matter of Example 16 optionally includes one or more antennas coupled to the transceiver circuitry.

Example 18 is a non-transitory computer-readable storage medium that stores instructions for execution by one or more processors to perform operations for communication by a UE comprising memory and processing circuitry coupled to the memory, the operations to configure the one or more processors to perform the following operations: receive a paging for a telephone call from a cellular access network node; and in response to the received paging: determine a packet data network (PDN) communication channel associated with a server application, the PDN including the cellular access node; and send a set of data to the server application via the determined PDN communication channel.

In Example 19, the subject matter of Example 18 optionally includes wherein the PDN communication channel associated with the server application is determined according to a caller identification data associated with the paging.

In Example 20, the subject matter of Example 19 optionally includes instructions to perform operations to configure the one or more processors to reject a telephone call associated with the paging after receiving the caller identification data.

In Example 21, the subject matter of any one or more of Examples 18-20 optionally include wherein PDN data to establish the PDN communication channel associated with the server application is predetermined and stored in a memory of the LE.

In Example 22, the subject matter of any one or more of Examples 18-21 optionally, include wherein a telephone call associated with the paging is not accepted.

As used herein, the term "circuitry" may refer to, be part of, or include an Application Specific integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an application server, the apparatus comprising memory; and processing circuitry coupled to the memory, the processing circuitry configured to:
   determine a telephone number associated with a client application executing on a user equipment (UE) and store the telephone number in the memory;
   initiate a telephone call to the UE associated with the client application via a cellular access network node according to the telephone number;
   receive a first set of data via a packet data network (PDN) including the cellular access network node from the client application, the first set of data including an Internet protocol (IP) address for communication with the client application;
   determine a PDN communication channel associated with the client application according to the received first set of data and the IP address; and
   send a second set of data to the client application via the PDN including the cellular access network node according to the PDN communication channel associated with the client application and the IP address.

2. The apparatus of claim 1, wherein the first set of data is received in response to the initiated telephone call.

3. The apparatus of claim 1, wherein the processing circuitry is further configured to send a prior set of data to the client application via the PDN including the cellular access network node, wherein the telephone call is initiated in response to a period of time after sending the prior set of data to the client application without receiving another set of data from the client application in response to the prior set of data exceeding a timeout threshold.

4. The apparatus of claim 1, wherein the processing circuitry is further configured to disconnect the telephone call to the UE associated with the client application in response to receiving the first set of data.

5. The apparatus of claim 1, further comprising transceiver circuitry coupled to the processing circuitry.

6. The apparatus of claim 5, further comprising one or more antennas coupled to the transceiver circuitry.

7. A non-transitory computer-readable storage medium that stores instructions for execution by one or more processors to perform operations for communication by an application server comprising memory and processing circuitry coupled to the memory, the operations to configure the one or more processors to perform the following operations:
  determine a telephone number associated with a client application executing on a user equipment (UE) and store the telephone number in the memory;
  initiate a telephone call to the UE associated with the client application via a cellular access network node according to the telephone number;
  receive a first set of data via a packet data network (PDN) including the cellular access network node from the client application, the first set of data including an Internet protocol (IP) address for communication with the client application;
  determine a PDN communication channel associated with the client application according to the received first set of data and the IP address; and
  send a second set of data to the client application via the PDN including the cellular access network node according to the PDN communication channel associated with the client application and the IP address.

8. The non-transitory computer-readable storage medium of claim 7, wherein the first set of data is received in response to the initiated telephone call.

9. The non-transitory computer-readable storage medium of claim 8, further comprising instructions to perform operations to configure the one or more processors to:
  send a prior set of data to the client application via the PDN including the cellular access network node, wherein the telephone call is initiated in response to a period of time after sending the prior set of data to the client application without receiving another set of data from the client application in response to the prior set of data exceeding a timeout threshold.

10. The non-transitory computer-readable storage medium of claim 8, further comprising instructions to perform operations to:
  configure the one or more processors to disconnect the telephone call to the UE associated with e client application in response to receiving the first set of data.

11. An apparatus of a user equipment (UE), the apparatus comprising memory; and
  processing circuitry coupled to the memory, the processing circuitry configured to:
    receive a paging for a telephone call from a cellular access network node; and
    in response to the received paging:
      determine a packet data network (PDN) communication channel associated with a server application executing on an application server, the PDN including the cellular access network node, and the PDN communication channel determined based on an Internet protocol (IP) address for communication with the server application; and
      send a set of data to the server application via the determined PDN communication channel.

12. The apparatus of claim 11, wherein the PDN communication channel associated with the server application is determined according to a caller identification data associated with the paging.

13. The apparatus of claim 12, wherein the processing circuitry is further configured to reject a telephone call associated with the paging after receiving the caller identification data.

14. The apparatus of claim 11, wherein PDN data to establish the PDN communication channel associated with the server application is predetermined and stored in the memory of the UE.

15. The apparatus of claim 11, wherein a tel ep one call associated with e paging is not accepted.

16. The apparatus of claim 11, further comprising transceiver circuitry coupled to the processing circuitry.

17. The apparatus of claim 16, further comprising one or more antennas coupled to the transceiver circuitry.

18. A non-transitory computer-readable storage medium that stores instructions for execution by one or more processors to perform operations for communication by a user equipment (UE) comprising memory and processing circuitry coupled to the memory; the operations to configure the one or more processors to perform operations comprising:
  receive a paging for a telephone call from a cellular access network node; and
  in response to the received paging:
    determine a packet data network (PDN) communication channel associated with a server application executing on an application server, the PDN including the cellular access network node, and the PDN communication channel determined based on an Internet protocol (IP) address for communication with the server application; and
    send a set of data to the server application via the determined PDN communication channel.

19. The non-transitory computer-readable storage medium of claim 18, wherein the PDN communication channel associated with the server application is determined according to a caller identification data associated with the paging.

20. The non-transitory computer-readable storage medium of claim 19, further comprising instructions to perform operations to configure the one or more processors to:
  reject a telephone call associated with the paging after receiving the caller identification data.

21. The non-transitory computer-readable storage medium of claim 18, wherein PDN data to establish the PDN communication channel associated with the server application is predetermined and stored in a memory of the UE.

22. The medium of claim 18, wherein a telephone call associated with the paging is not accepted.

* * * * *